(12) United States Patent
Yanagihara et al.

(10) Patent No.: US 7,579,990 B2
(45) Date of Patent: Aug. 25, 2009

(54) METHOD AND SYSTEM FOR ESTIMATING THE LOCATION OF A WIRELESS TERMINAL FROM A RECEIVED SIGNAL STRENGTH

(75) Inventors: Kentarou Yanagihara, Tokyo (JP); Daisuke Anzai, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 12/071,483

(22) Filed: Feb. 21, 2008

(65) Prior Publication Data

US 2008/0204321 A1 Aug. 28, 2008

(30) Foreign Application Priority Data

Feb. 26, 2007 (JP) ............................. 2007-045041
Aug. 10, 2007 (JP) ............................. 2007-209375

(51) Int. Cl.
*G01S 3/02* (2006.01)
(52) U.S. Cl. .................. 342/463; 342/450; 342/458
(58) Field of Classification Search ................ 342/450, 342/453, 458, 463; 455/456.1, 456.2, 456.6
See application file for complete search history.

(56) References Cited

U.S. PATENT DOCUMENTS

| | | | |
|---|---|---|---|
| 6,473,038 B2 | 10/2002 | Patwari et al. | |
| 2005/0032526 A1* | 2/2005 | Chen et al. | 455/456.1 |
| 2008/0113672 A1* | 5/2008 | Karr et al. | 455/456.1 |
| 2008/0207219 A1* | 8/2008 | Bhattacharya et al. | 455/456.1 |

FOREIGN PATENT DOCUMENTS

JP 2004-112482 4/2004

OTHER PUBLICATIONS

D. Zhao et al., "A Maximum Likelihood Estimation Method of Localization using RSSI in Wireless Sensor Networks", Technical Report, The Institute of Electronics, Information and Communication Engineers (IECE), IN2004-327, pp. 409-414, 2004.

M. Takashima et al., "An Experiment of Indoor Location Estimation using IEEE 802.15.4", Technical Report, IECE, IN2005-7, pp. 27-32, 2005.

D. Zhao et al., "A Method for Reducing Location Estimation Data Traffic in Sensor Networks", The Society Conference Transactions in 2005, IECE, A-21-20.

(Continued)

*Primary Examiner*—Dao L Phan
(74) *Attorney, Agent, or Firm*—Rabin & Berdo, P.C.

(57) ABSTRACT

A first estimated location of a target terminal to be estimated in its location is obtained based on information derived from radio signals for location estimation and also locations of anchor terminals. Then, on the basis of the first estimated location thus obtained, estimated distances are calculated while expected values are calculated based on information required for location estimation to compare the estimated distances with the expected-values. Depending on the comparison result, one or more anchor terminals are selected as nonuse terminals. On the basis of information required for location estimation derived from radio signals sent by the anchor terminals other than the selected nonuse terminals and also on the locations of the anchor terminals except the nonuse terminals, a second estimated location of the target terminal is obtained.

21 Claims, 5 Drawing Sheets

OTHER PUBLICATIONS

M. Takashima et al., "An Experiment on Indoor Location Estimation Using IEEE 802.15.4—Effect by Pedestrians and RF Sensitivities", The Society Conference Transactions in 2005, IECE, A-21-22.

K. Iwamoto et al, "An Iterative Location Estimation Method for Wireless Sensor Networks", Technical Report, IECE, IN2006-39, pp. 7-14, 2006.

* cited by examiner

METHOD AND SYSTEM FOR ESTIMATING THE LOCATION OF A WIRELESS TERMINAL FROM A RECEIVED SIGNAL STRENGTH

BACKGROUND OF THE INVENTION

1. Field of the Invention

The present invention relates to a method and a system for estimating the location of a wireless terminal from radio signals received, and a wireless terminal therefor.

2. Description of the Background Art

Conventionally, as disclosed by Japanese patent laid-open publication No. 2004-112482, in a system for estimating the location of a radio communication terminal, base stations receive a radio signal sent from a radio communication terminal and measures the signal strength of the received signal to transmit a measurement of the strength level to an information server, which in turn uses the measurement of signal strength received to estimate areas where the radio communication terminal associated with the measurement of signal strength received can exist to determine the location of the radio communication terminal from how the estimated areas overlap with each other.

U.S. Pat. No. 6,473,038 to Patwari et al., discloses a system for locating a number of devices by measuring signals transmitted between known location devices and unknown location devices and signals transmitted between pairs of unknown location devices, entering signal measurements into a graph function that includes a number of first sub-expressions, a number of which include signal measurement prediction sub-expressions and have extreme when a predicted signal measurement is equal to an actual signal measurement, and optimizing the graph function.

Furthermore, there are some examples of location estimation of a target terminal, in which a target terminal sends signals to anchor terminals, which in turn transmit received signal strength measurements of the received signals to a location estimation server, which uses the received signal strength measurements from the anchor terminals to estimate the most probable location of the target terminal. These examples are disclosed in D. Zhao et al., "A Maximum Likelihood Estimation Method of Localization using RSSI in Wireless Sensor Networks", Technical Report, The Institute of Electronics, Information and Communication Engineers (IECE), IN2004-327, pp. 409-414; M. Takashima et al., "An Experiment of Indoor Location Estimation using IEEE 802.15.4", Technical Report, IECE, IN2005-7, pp. 27-32; D. Zhao et al., "A Method for Reducing Location Estimation Data Traffic in Sensor Networks", The Society Conference Transactions in 2005, IECE, A-21-20; M. Takashima et al., "An Experiment on Indoor Location Estimation Using IEEE 802.15.4—Effect by Pedestrians and RF Sensitivities—", The Society Conference Transactions in 2005, IECE, A-21-22; and K. Iwamoto et al., "An Iterative Location Estimation Method for Wireless Sensor Networks", Technical Report, IECE, IN2006-39, pp. 7-14.

In the conventional location estimation systems, however, the accuracy of location estimation depends on the placing distances between anchor terminals, so that the anchor terminals must be placed densely to increase the estimation accuracy. Placement of a number of anchor terminals leads to the increase of cost of the system. Furthermore, it is conceivable that the placement of a lot of terminals is physically impossible depending on the placement circumstances. In addition, the more the anchor terminals, the higher the communications traffic for the location estimation.

In some instances, the reliability of information derived from an anchor terminal located in a certain direction is lower than that of information derived from other anchor terminals. For example, when location estimation is carried out on a person who is moving about, his/her body may be an obstacle to the estimation unless he/she carries his/her terminal overhead. Also, if there are, for instance, partitions, shelves or walls between a target terminal and anchor terminals located in a target space for the estimation, they can be obstructions to the estimation. As described, information derived from a specific anchor terminal can be less reliable, and therefore the use of such information for the location estimation may cause a decrease in estimation accuracy.

Thus, there has been a demand for a method and a system for location estimation, and a radio terminal therefor to overcome the problem of increase of communications traffic arising from the expansion of area for the location estimation and the increase of anchor terminals to be placed, thereby enabling high-accuracy estimation even if the reliability of information derived from a specific anchor terminal is lower.

SUMMARY OF THE INVENTION

It is therefore an object of the invention to provide a method and a system for location estimation, and a radio terminal therefor specifically improved in accuracy of estimating the location of a radio terminal.

In accordance with the present invention, a method Of estimating the location of a target terminal by using a radio signal and the location of a plurality of anchor terminals, the radio signal being transmitted at least in either of directions from the target terminal to the plurality of anchor terminals and from the plurality of anchor terminals to the target terminal, comprises the steps of: using information required for location estimation derived from the radio signal and the location of at least one of the plurality of anchor terminals to obtain a first estimated location of the target terminal; calculating an estimated distance between the target terminal and the at least one anchor terminal based on the first estimated location, and calculating an expected value of a distance between the target terminal and the at least one anchor terminal based on the information required for the location estimation; comparing the estimated distance with the expected value to thereby select at least one of the plurality of anchor terminals as a nonuse terminal; and using the information required for the location estimation derived from the radio signal transmitted at least either of the directions except for the at least one nonuse terminal, and the location of ones of the plurality of anchor terminals other than the at least one nonuse terminal to obtain a second estimated location of the target terminal.

In accordance with the present invention, a system for estimating a location of a target terminal comprises: a target terminal for at least transmitting a radio signal; a plurality of anchor terminals each arranged at a known location for at least receiving the radio signal; and a location estimator for estimating the location of the target terminal. The location estimator uses information required for location estimation derived from the radio signal and the location of the plurality of anchor terminals to obtain a first estimated location of the target terminal, calculates an estimated distance between the target terminal and at least one of the anchor terminals based on the first estimated location, calculates an expected value of a distance between the target terminal and the at least one anchor terminal based on the information required for the location estimation, compares the estimated distance with the expected value to thereby select at least one of the plurality of anchor terminals as a nonuse terminal, and uses the information required for the location estimation derived from the radio signal transmitted to or from ones of the plurality of anchor terminals other than the at least one nonuse terminal and the location of the anchor terminals other than the at least one nonuse terminal to obtain a second estimated location of the target terminal.

Also, in accordance with the present invention, a radio terminal consists of the location estimator, the target terminal or the anchor terminal of the aforementioned location estimation system.

The present invention can improve the accuracy of location estimation for a target terminal by selecting at least one of the plurality of anchor terminals as at least one nonuse terminal and obtaining the location of the target terminal on the basis of information required for the location estimation, which is derived from radio signals transmitted between the plurality of anchor terminals other than the selected nonuse terminal and the target terminal and also based on the locations of the plurality of anchor terminals other than the selected nonuse terminal.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
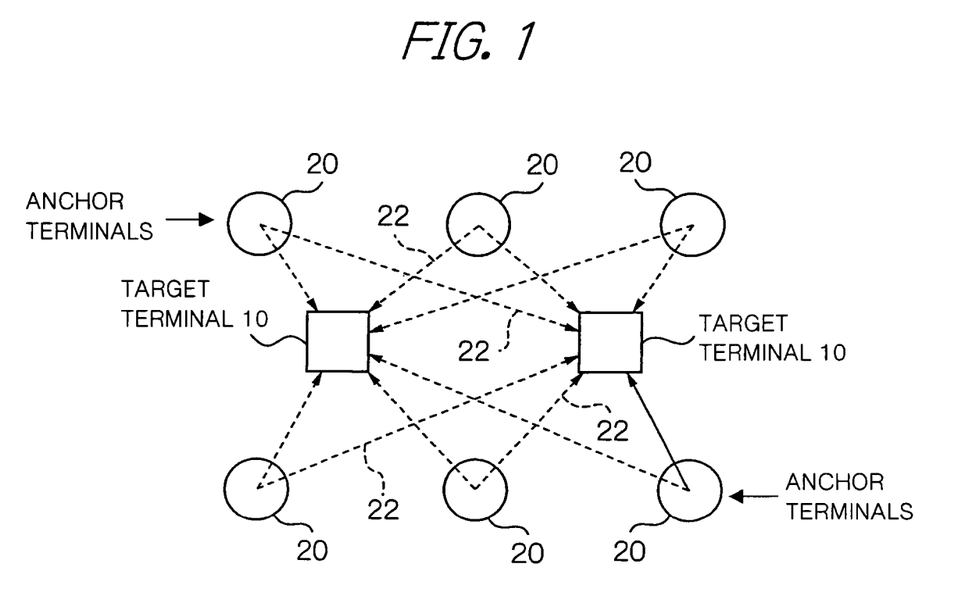
FIG. 1 schematically shows a preferred embodiment of a location estimation system of the present invention.

FIG. 1 schematically shows a preferred embodiment of the location estimation system. In FIG. 1, the location estimation system of the embodiment includes two target terminals 10 and a number of anchor terminals 20. This figure shows dotted arrows 22 indicating that signals are transmitted to all neighboring terminals without specifying recipients, i.e. broadcast transmission. Signals are designated with reference numerals of connections on which they are conveyed. The anchor terminals 20 are at known locations and transmit location-estimation request signals. The target terminals 10 are the objects of location estimation. Each target terminal 10 receives the location-estimation request signals from the anchor terminals 20 and derives information required for location estimation, such as received signal strength (received power value), thereby estimating its location.

Figure 2:
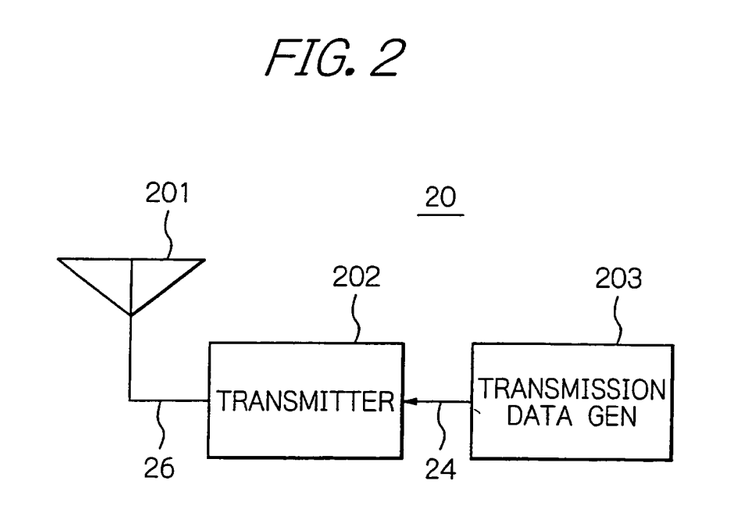
FIG. 2 is a schematic block diagram showing an anchor terminal of the embodiment shown in FIG. 1.

FIG. 2 schematically shows the configuration of one of the anchor terminals 20 of the embodiment shown in FIG. 1, which shows the six anchor terminals 20 that may be of the same structure as each other. In FIG. 2, the anchor terminal 20 comprises an antenna 201, a transmitter 202 and a transmission data generator 203, which are interconnected as illustrated. The antenna 201 serves as transmitting a radio signal 22. The transmission data generator 203 has an identification code set specific to the anchor terminal 20, i.e. different from anchor terminal to terminal, and is adapted to generate a location-estimation request signal 24 which includes the identification code. The transmitter 202 functions as converting the location-estimation request signal 24 generated by the generator 203 to a corresponding radio signal 26 to output the signal to the antenna 201.

Figure 3:
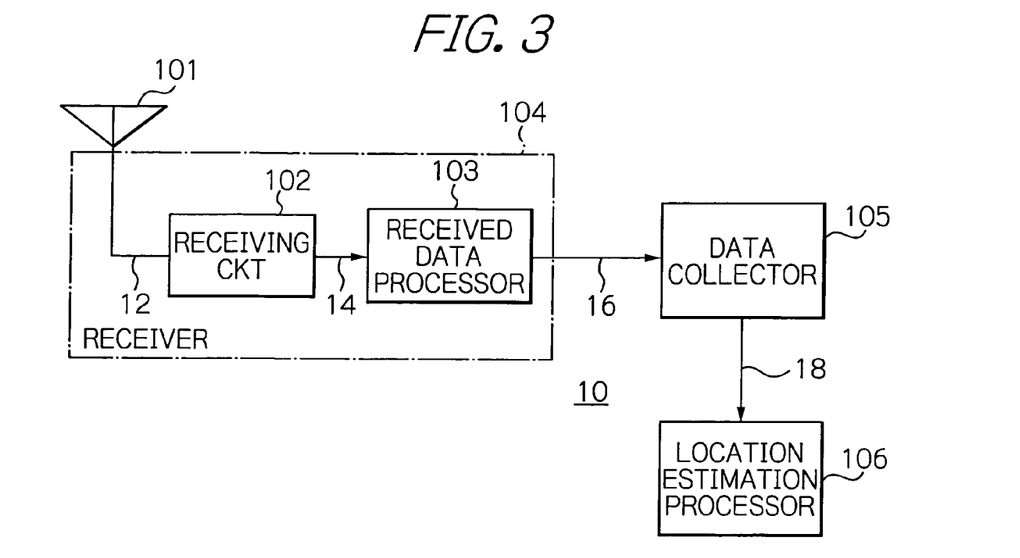
FIG. 3 is a schematic block diagram showing a target terminal of the embodiment.

Now, FIG. 3 schematically shows the configuration of the target terminal 10 in the illustrative embodiment. In FIG. 3, the target terminal 10 comprises an antenna 101, a receiver 104 interconnected to the antenna 101, a data collector 105 and a location estimation processor 106 serving as a location estimator, which are interconnected as illustrated. The receiver 104 includes a receiving circuit 102 and a received data processor 103, interconnected as shown.

The antenna 101 is used to receive the radio signal 22 and input a received signal 12 to the receiving circuit 102. The receiving circuit 102 is adapted to convert the radio signal 12 to corresponding digital data 14 to output the data 14 as received data to the received data processor 103. In addition, the receiving circuit 102 has the function of measuring the received power value S1 of the radio signal 22 and then outputs the measured value S1 on its output 14 to the received data processor 103 as information necessary to the location estimation. The received data processor 103 is adapted for processing the received data 14 input by the receiving circuit 102 to thereby deliver, if the received data 14 is the location-estimation request signal transmitted from the anchor terminal 20, the information contained in the request signal as well as the information on the received power value S1 measured by the received circuit 102 on its output 16 to the data collector 105.

The data collector 105 functions as collecting the information 16 input from the receiver 104 and outputting the information 16 to the location estimation processor 106. The location estimation processor 106 operates as described below to estimate the location of each target terminal 10 based on the information 16 input by the data collector 105. It is to be noted that the data collector 105 and the location estimation processor 106 may be designed in the form of separate unit interconnected to the received data processor 103 over telecommunications, rather than those illustrated as incorporated in the target terminal 10. In this case, the received data processor 103 is adapted to transmit necessary data 16 in the form including the identification data of the target terminal 10 in which the processor 103 is included.

The operation of the illustrative embodiment of the location estimation system thus configured will be described with reference to FIG. 4. In operation, the system is specifically applied to a location estimation method utilizing the received power values of the radio signals 22 transmitted from the anchor terminals 20 to the target terminals 10. However, since the system, comprising the plurality of anchor terminals 20 and the target terminals 10, is operable to estimate the location of a target terminal 10 in some measures, the system is adaptable to any types of location estimation system capable of estimating the distance between each anchor terminal 20 and the target terminals 10 in some measures.

Figure 4:
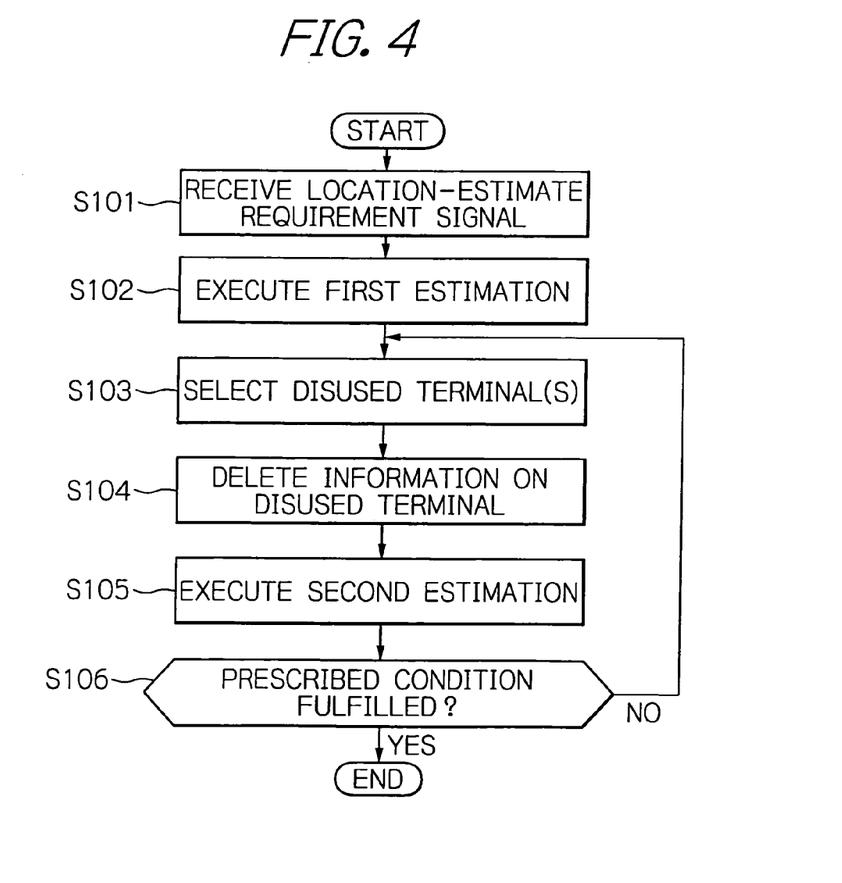
FIG. 4 is a flowchart useful for understanding the operation of location estimation of the embodiment.

FIG. 4 is a flowchart for use in describing the operation of the location estimation in the illustrative embodiment. Each anchor terminal 20 transmits a location-estimation request signal 22 including an identification code unique to the anchor terminal 20, or transmitting terminal code. On the target terminals 10, the receiver 104 receives the location-estimation request signal 22 from the anchor terminals 20 and measures the received power value S1 of the signal 22 to output the data 16 of power value S1 along with the transmitting terminal code to the data collector 105 (S101).

The data collector 105, in turn, collects the data 16 from the receiver 104 to deliver the latter to the location estimation processor 106. The location estimation processor 106 stores the data 18 provided from the collector 105, and executes, based on the stored data, a first estimation step S102 for obtaining a first estimated location of the target terminal 10 in question.

In the first estimation step S102, use is made of information about the received power value S1 and the transmitting terminal code contained in the location-estimation request signal 22 received by the target terminal 10 as well as the locations of the anchor terminals 20 to obtain the first estimated location of the target terminal 10 in question.

In the location estimation in the step S102, the information transmitted from the anchor terminals 20 to the target terminal 10 in question and the locations of the anchor terminals 20, for example, are used for calculating an existence probability at every possible position of the target terminal 10 in question. Then, a method, such as the maximum likelihood estimate method, is used to thereby locate a position where the existence probability of the antenna 101 is highest and define the position thus obtained as the estimated location of the target terminal 10 in question.

Alternatively, another method can be employed which uses the distances between each anchor terminal 10 and the target terminal in question 10. That is, several pieces of distance information can be used to estimate the location of the target terminal 10. In such a method, for instance, estimated distances R between each anchor terminal 20 and the target terminal 10 in question are calculated according to the information transmitted between each anchor terminal 20 and the target terminal 10 in question, and also distances D between the target terminal 10 at an assumed position (x, y) and each anchor terminal 20 are calculated. The absolute value of difference |R−D| is then calculated in relation to each anchor terminal 20, and the sum of the absolute values of difference is calculated for all the anchor terminals 10. The obtained sum is then minimized to thereby determine the estimated location (x, y) of the target terminal 10. Note that the method for obtaining the estimated location is not limited to the specific one described above, but other suitable methods can be employed.

On the basis of the first estimated location, in the step S103, the location estimation processor 106 calculates estimated distances between the target terminals 10 and the anchor terminals 20 while using the information required for the location estimation to calculate expected values of the distances between the target terminals 10 and the anchor terminals 20. The processor 106 then compares the estimated locations with the expected values so as to select at least one of the anchor terminals 20 as a nonuse or disused terminal/terminals, as not used for the location estimation.

Detailed description about selecting nonuse terminals will now be described. It is assumed that the first estimated location of the target terminal 10 obtained in step S102 is positioned at the coordinates (x, y). Furthermore, the anchor terminals 20 are numbered such that the i-th anchor terminal 20 is positioned at the coordinates (xi, yi), where i is a natural number.

Now, assuming that the distance between the first estimated location of the target terminal 10 of interest and the i-th anchor terminal 20, that is, the estimated distance Di, is given by an expression $[(xi-x)^2+(yi-y)^2]^{1/2}$. In addition, the distance between the target terminal 10 in question and the i-th anchor terminal 20 estimated from the information transmitted between each anchor terminal 20 and the target terminal 10 in question is the expected value Ri.

An example will be described which uses the received signal strengths of the signals transmitted from the anchor terminals 20 to the target terminals 10. Received signal strength is generally in inverse relation to a constant multiplier of the distance. Accordingly, the expected values of the distances, i.e. Ri, between the target terminals 10 and the anchor terminals 20 can be calculated from the received signal strengths used for the location estimation.

Hereinafter, the strength of a signal received by one target terminal 10 from the i-th anchor terminal 20, or information similar thereto, is represented by Pi. Furthermore, assume that represented by pi is the received signal strength, or similar information, between the target terminal 10 and the i-th anchor terminal 20, which is expected from the estimated distance Di between these terminals resultant from the position estimation.

The location estimation processor 106 selects a certain number, described later, of anchor terminals 20 as nonuse or disused terminals by any of the following selection methods:

1—select anchor terminals 20 in the order descending from the largest value of parameter |Di−Ri|;

2—select anchor terminals 20 in the order descending from the largest value of parameter |Di−Ri|/Ri;

3—select anchor terminals 20 in the order descending from the largest value of parameter |Di—Ri|/Di;

4—select anchor terminals 20 in the order descending from the largest value of parameter |Pi−pi|;

5—select anchor terminals 20 in the order descending from the largest value of parameter |Pi−pi|/Pi;

6—select anchor terminals 20 in the order descending from the largest value of parameter |Pi−pi|/pi;

7—select anchor terminals 20 in the order descending from the largest value of parameter Di;

8—select anchor terminals 20 in the order descending from the largest value of parameter Ri;

9—select anchor terminals 20 in the order descending from the largest or smallest value of parameter Pi; and

10—select anchor terminals 20 in the order descending from the largest or smallest value of parameter pi.

The location estimation processor 106 then determines the certain number of nonuse terminals to be selected by any of the following determining methods 1 to 6. It means-that the estimation processor 106 determines the number based on at least one of the estimated distance Di and the expected value Ri.

Determining Method 1—always select one or a predetermined number of, anchor terminals 20;

Determining Method 2—derive an average with respect to the parameter specified in any of the above selection methods #1 to #10 for all anchor terminals 20, and select all anchor terminals 20 having the value above or below the average derived;

Determining Method 3—derive a variance and a standard deviation with respect to the parameter specified in any of the above selection methods #1 to #10 for all anchor terminals 20, and select all anchor terminals 20 which are determined as having an outlier therefrom;

Determining Method 4—select all anchor terminals 20 which are above or below a predetermined value in respect of the parameter specified in any of the above selection methods #1 to #10;

Determining Method 5—implement Determining Methods #1 to 4 and, in addition, specify a minimum required number of anchor terminals 20 to modify the number of anchor terminals 20 to be selected such that the minimum number of terminals 20 or more will remain; and Determining Method 6—implement Determining Methods #1 to #4 and, in addition, specify a minimum required ratio of anchor terminals 20 to modify the number of anchor terminals 20 to be selected such that if the number of the anchor terminals, which could derive the information, or all anchor terminals is normalized to be unity, the number of anchor terminals 20 corresponding to the minimum ratio or more will remain.

Next in the S104, the location estimation processor 106 deletes the information on the anchor terminals 20 selected as nonuse terminals from the stored information which is received from the data collector 105 in step S101. Note that, as an alternative to deleting the information, an identifier, e.g. a flag, may be set to define such a state that the information set with the identifier will not be used in the succeeding processes.

Based on the information on the anchor terminals 20 excluding one on the nonuse terminals, the location estimation processor 106 executes a second estimation S105 for obtaining a second estimated location of the target terminal 10 in question.

In the second estimation stage, use is made of information that the target terminal 10 has received from the anchor terminals 20 other than the selected nonuse anchor terminals, that is, information about the received power value S1 and the transmitting terminal code contained in the location-estimation request signal as well as the locations of the anchor terminals 20 to obtain the second estimated location of the target terminal 10 in question. The estimated location may be obtained by any of the methods employed in the first estimation step S102.

The location estimation processor 106 determines whether or not a prescribed condition, described later, is fulfilled (S106). If any condition is fulfilled, then the processor 106 finishes the location estimation processing, or otherwise iterates the processes in steps S103 to S105. At this time, the processor 106 uses as the first estimated location the second estimated location of the target terminal 10 in question obtained in step S105 to execute the step S103 of selecting nonuse terminals to thereby obtain a second estimated location once again.

The determination in step S106 is made on whether or not the prescribed condition is fulfilled according to any of the following Determinations:

1—finish the procedure if the process in step S106 is executed for a predetermined number of times;

2—store the result of the location estimation carried out last time in step S106, and then finish the procedure if the difference between the previous and current results comes down to a certain value, that is, finish the procedure when the results of the location estimation are determined as having converged;

3—in addition to the condition in the above Determination #1 or #2, record the time of the first execution of the process in step S106, and finish the procedure when a certain period of time elapses therefrom;

4—finish the procedure if the existence probability of the target terminal 10 at the second estimated location becomes lower than the probability at the first estimated location or at the second estimated location obtained in the previous execution of process in step S106. At this time, the estimated location of the target terminal 10 ultimately determined is where the existence probability is highest, i.e. either the first estimated location or the second estimated location obtained in the previous execution of process in step S106. To this end, the results of calculating estimated location and the existence probability have to be recorded in the location estimation processor 106 each time the calculation of the estimated location of the target terminal 10 is implemented. Furthermore, when employing Determination #4, in the step S103 of selecting a nonuse anchor terminal, Determining Method #1 is employed so as to select a single nonuse anchor terminal all the time;

5—alternative to the existence probability used in Determination #4, use a value resultant from dividing the existence probability of the target terminal 10 at the estimated location by the number of anchor terminals 20 used for the location estimation; and

6—determine by any combination of the conditions of Determinations #1 to #5.

In this way, the repetition of the steps S103 to S106 enables to exclude from the location-estimating calculation the anchor terminals 20 that have transmitted information including large errors for estimating the distances between the target terminal 10 and the anchor terminals 20, so that high-accuracy estimation can be achieved. The following are examples of situations where such transmitted information includes large errors in an application in which information on a received signal power is transmitted.

Example #1—a situation where a location estimation object attaching the target terminal 10 is per se an obstacle;

Example 2—a situation where the target terminal 10 locates with respect to a specific anchor terminal 20 with an obstacle existing in between, the obstacle being, for instance, a column standing on a location estimation plane; and Example 3—a situation where the transmission output power of a target terminal 10 of interest differs from an assumed output power for some cause.

As described, in the illustrative embodiment, one or more anchor terminals 20 are selected as nonuse terminals depending on a result of a comparison between the estimated distance Di and the expected value Ri, and then the estimation is iterated by using the information on the anchor terminals 20 other than the information on the nonuse anchor terminals, so that the accuracy of the estimated location can be improved.

In the illustrative embodiment, the selection of nonuse terminal is performed in step S103 by using the estimated distance Di and the expected value Ri, but is not limited in scope of the invention in this respect. Alternatively, the system may be adapted such that a defect or malfunction of the anchor terminals 20 may be determined to thereby define the anchor terminals thus determined defective as nonuse terminals.

The operation of the alternative example will now be described. The location estimation processor 106 stores earlier results of selection of nonuse terminals obtained in the repetition of the step S103. On the basis of the stored data, if a specific anchor terminal 20 has been selected as a nonuse terminal continuously or with a predetermined probability or more, then the anchor terminal 20 in question is determined as a defective terminal. The defective anchor terminal 20 thus determined is subsequently selected as the nonuse terminal in step S103.

Furthermore, the location estimation processor 106 can use for the location estimation a plurality of location-estimation request signals derived from the same anchor terminal 20. More specifically, information required for the estimation derived from radio signals 22 transmitted to the target terminal 10 from the anchor terminal 20 may be stored to use the stored information to calculate the estimated location of the target terminal 10. Taking the method using the received power as an example, the following ways can be applied to the estimation:

Way #1—use the average of the stored received power values; and

Way #2—use the largest one of the stored received power values.

Moreover, a period of time can be used which has elapsed from the time of reception of location-estimation request signal 22 to the time of execution of location estimation. More specifically, according to the time period elapsing from-the reception of a radio signal 22, the stored old information is selected to be used in the location estimation. Such information is used because, considering that the target terminal 10 moves around, the data with a time elapsing longer is very likely not to reflect the latest information on the location of the target terminal.

Figure 5:
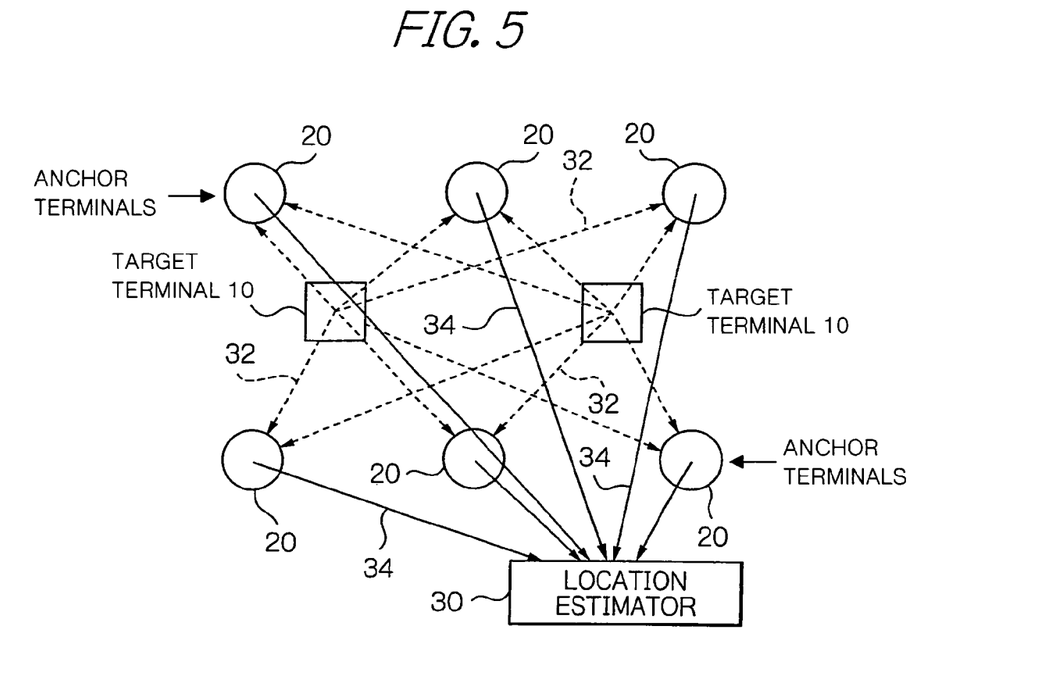
FIG. 5 schematically shows, like FIG. 1, an alternative embodiment of the location estimation system of the present invention.

Now, reference will be made to FIG. 5 schematically showing an alternative embodiment of the location estimation system of the invention. In FIG. 5, the system comprises a location estimator 30 in addition to the target terminals 10, the anchor terminals 20. Like components are designated with the same reference numerals, and a repetitive description thereon will be avoided.

Each target terminal 10 is an object of location estimation and is adapted to transmit a location-estimation request signal 32 to the anchor terminals 20. The anchor terminals 20 are at known locations and adapted to receive the location-estimation request signal 32, and derive information from the received signal 32, which is required for estimating the location, such as received signal strength, or received power value. The derived information for the location estimation is transmitted to the location estimator 30 in the form of location estimation information signal 34.

The location estimator 30 is adapted for estimating the location of each target terminal 10 using the received information signals 34. Note that the dotted arrows 32 shown in the figure indicate that signals are transmitted to all peripheral terminals without specifying recipients, i.e. broadcast, whereas the solid arrows 34 represent that signals are directed to a terminal or station, such as the location estimator 30, pointed by the arrows, the transmission being of unicast.

Figure 6:
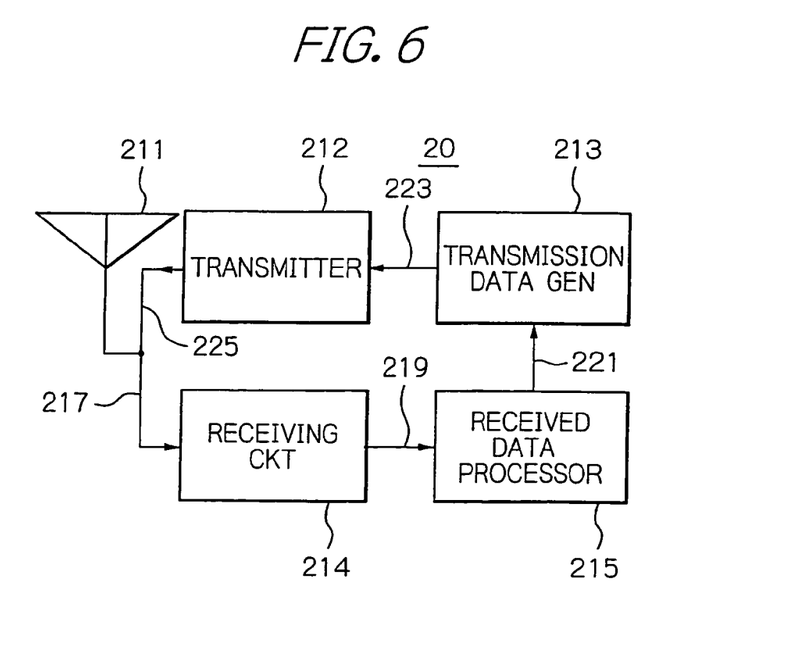
FIG. 6 is a schematic block diagram, like FIG. 2, showing an anchor terminal of the alternative embodiment.

FIG. 6 schematically shows the configuration of one of the anchor terminals 20 of the alternative embodiment. The anchor terminals 20 may be of the same structure as each other, and the anchor terminal 20 depicted comprises an antenna 211, a transmitter 212, a transmission data generator 213, a receiving circuit 214 and a received data processor 215, which are interconnected as illustrated.

The antenna 211 is adapted to transmit and receive radio signals 34 and 32, respectively. The antenna 211 is adapted to input a received radio signal 217 to the receiving circuit 214, which is adapted to convert the signal 217 to corresponding digital information 219 to output the information 219 in the form of received data to the received data processor 215. In addition, the receiving circuit 214 measures a received power value S1 of the radio signal 32 to output information on the measured value S1 on its output 219 to the received data processor 215.

The received data processor 215 processes the received data 219 input by the receiving circuit 214, and functions as instructing, if the received data 219 is the location-estimation request signal transmitted from the target terminal 10, the transmission data generator 213 to generate transmission data 221 including the information about the received power value S1 measured by the receiving circuit 214 and a transmitting terminal code contained in the location-estimation request signal.

The transmission data generator 213 is operative in response to the instruction 221 by the received data processor 215, to produce a location estimation information signal 223 containing the information of the received power value S1 input by the received data processor 215 and an identification code unique to the terminal 20 in question to output the thus produced signal 223 to the transmitter 212.

The transmitter 212 serves to convert the signal 223 representative of a location-estimation request or location estimation information produced by the transmission data generator 213 to a corresponding radio signal 225 to output the radio signal 225 to the antenna 211.

The configuration of the target terminal 10 of the alternative embodiment may be similar to that of the anchor terminal 20 of the illustrative embodiment shown in FIG. 2.

The configuration of the location estimator 30 of the alternative embodiment may be similar to that of the target terminal 10 of the illustrative embodiment shown in FIG. 3. It is to be noted that the receiver 104, the data collector 105 and the location estimation processor 106 can be provided separately, and the received data processor 103 maybe connected to the data collector 105 over telecommunications.

The operation of the alternative embodiment of the location estimation system thus configured will now be described. As in the case of the illustrative embodiment describe earlier, the alternative embodiment will be described when applied to a location estimation method utilizing the received power values of the radio signals 32 and 34 transmitted between the anchor terminals 20 and the target terminals 10. However, since the system of the alternative embodiment comprises the plurality of anchor terminals 20 and the target terminals 10 and is operable to estimate the location of a target terminal in some measures, the system is adaptable to any kinds of location estimation system which is capable of estimating the distance between each anchor terminal 20 and the target terminals 10 in some measures.

Each target terminal 10 sends toward all neighboring terminals a location-estimation request signal 32 including an identification code as a transmitting terminal code unique to the target terminal 10.

Each anchor terminal 20 receives the location-estimation request signal 32 and measures the received power value S1 of the signal. The anchor terminal 20 in turn outputs the information on the power value S1 and the transmitting terminal code along with a location estimation information signal containing its own identification code to the location estimator 30 in the form of radio signal 34.

The location estimator 30, in turn, collects and stores the information contained in the location estimation information signals 34 delivered from the anchor terminals 20 in every identification code of the target terminals 10, thereby estimating, based on the stored information, the location of each target terminal 10.

The location estimator 30 estimates the location of target terminal 10 in a way similar to the operation carried by the location estimation processor 106 in the illustrative embodiment shown in and described with reference to FIG. 4. Note that, as the location estimator 30 estimates the location of the target terminals 10 separately from each other, the location estimator 30 may be adapted to perform a simple parallel processing.

As described, since the location estimation operation is not required in each target terminal 10 in the alternative embodiment, the system can achieve, in addition to the advantages attained in the illustrative embodiment described with reference to FIG. 1, the reduction in size and weight of the target terminal 10 and also achieve its longer mission time. Furthermore, if several target terminals 10 exist, the location estimator 30 can utilize information on these terminals 10 to thereby estimate the location of these terminals, whereby the accuracy of the estimation can be further improved than in the illustrative embodiment shown in FIG. 1.

As in the case of the illustrative embodiment shown in FIG. 1, defects or malfunctions of the anchor terminals 20 may be determined in the alternative embodiment to select the anchor terminals 20, which are determined defective, as nonuse terminals. In this case, the location estimator 30 can store information on nonuse terminals each time nonuse terminals are determined so as to select nonuse terminals on the basis of the stored information to estimate the location of any of the target terminals 10.

Defective terminals can be determined, for instance, with all target terminals 10 sharing information on defective terminals with each other, or separately from target terminal to terminal 10. The latter way is implemented due to the possibility that the selection of defective terminals might be affected by the position or direction where the target terminals 10 are installed on targets, or objects.

In the above description, the location estimator 30 is in direct communication with each anchor terminal 20 as seen from FIG. 5. Alternatively, the estimator 30 can be configured to collect data transmitted by multi-hop transmission via neighboring anchor terminals 20 or terminals for relaying data.

Furthermore, the location estimation processor 106 in the location estimator 30 of the alternative embodiment may be adapted to utilize, as with in the first embodiment shown in FIG. 1, the information derived from the same anchor terminal 20 in the past to issue a plurality of location-estimation request signals for location estimation.

Another alternative embodiment of the location estimation system is configured to utilize information in a location-estimation request signal sent from one target terminal 10 to neighboring target terminals 10 along with the information used in the alternative embodiment shown in and described with reference to FIG. 5.

Figure 7:
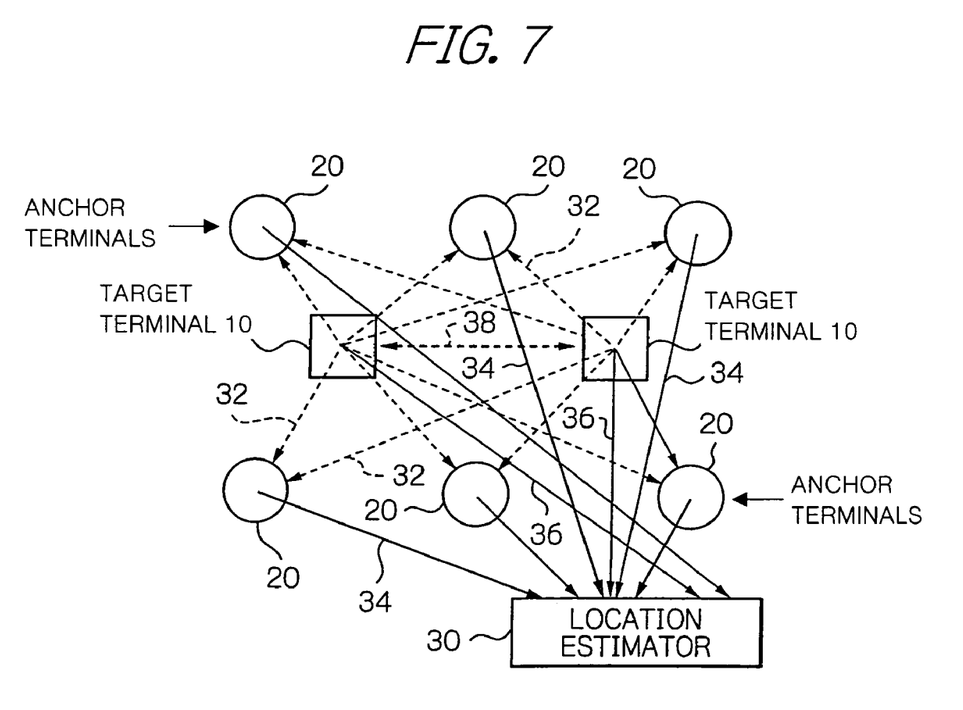
FIG. 7 schematically shows, like FIG. 1, another alternative embodiment of the location estimation system of the present invention.

FIG. 7 schematically shows the other alternative embodiment of the location estimation system of the invention. As shown in FIG. 7, the system comprises the target terminals 10, the anchor terminals 20 and the location estimator 30. Each target terminal 10 is an object of location estimation and transmits a location-estimation request signal 32. Furthermore, when a target terminal 10 receives a location-estimation request signal from another target terminal 10, the target terminal 10 in question derives information from the received signal, which is required for location estimation, such as received signal strength, or received power value. The derived information for the location estimation is transmitted to the location estimator 30 in the form of location estimation information signal 36.

The anchor terminals 20 are at known locations and receive the location-estimation request signal 32 from the target terminals 10 to derive information from the received signal 32, which is required for estimating the location, such as received signal strength, or received power value. The derived information for the location estimation is transmitted to the location estimator 30 in the form of location estimation information signal 34.

The location estimator 30 uses the received information signal 34 and 36 to estimate the location of each target terminal 10. It is to be noted that the dotted arrows 32 and 38 shown in the figure indicate that signals are transmitted to all peripheral terminals without specifying recipients (broadcast), whereas the solid arrows 34 and 36 represent that signals are meant for a terminal or unit pointed by the arrows (unicast transmission).

The configurations of the target terminal 10 and the anchor terminal 20 of the third embodiment shown in FIG. 7 may be similar to that of the anchor terminal 20 of the alternative embodiment shown in FIG. 6. The configuration of the location estimator 30 may be the same as the target terminal 10 of the first embodiment shown in FIG. 3. Alternatively, the receiver 104, the data collector 105 and the location estimation processor 106 may be provided separately from each other, and the received data processor 103 and the data collector 105 can be connected to each other through telecommunications.

Next, the operation of the third embodiment with the above configuration will be described with further reference to FIG. 8. Exemplarily, the operation in this embodiment is directed to a location estimation method using received power values of radio signals transmitted between the anchor terminals 20 and the target terminals 10. However, the present invention is directed to the system comprising a plurality of anchor terminals 20 and the target terminals 10 and adapted to estimate a location in any measures, the present invention is applicable to any kinds of location estimation system which can estimate a distance between each anchor terminal 20 and the target terminals 10 by any methods.

Figure 8:
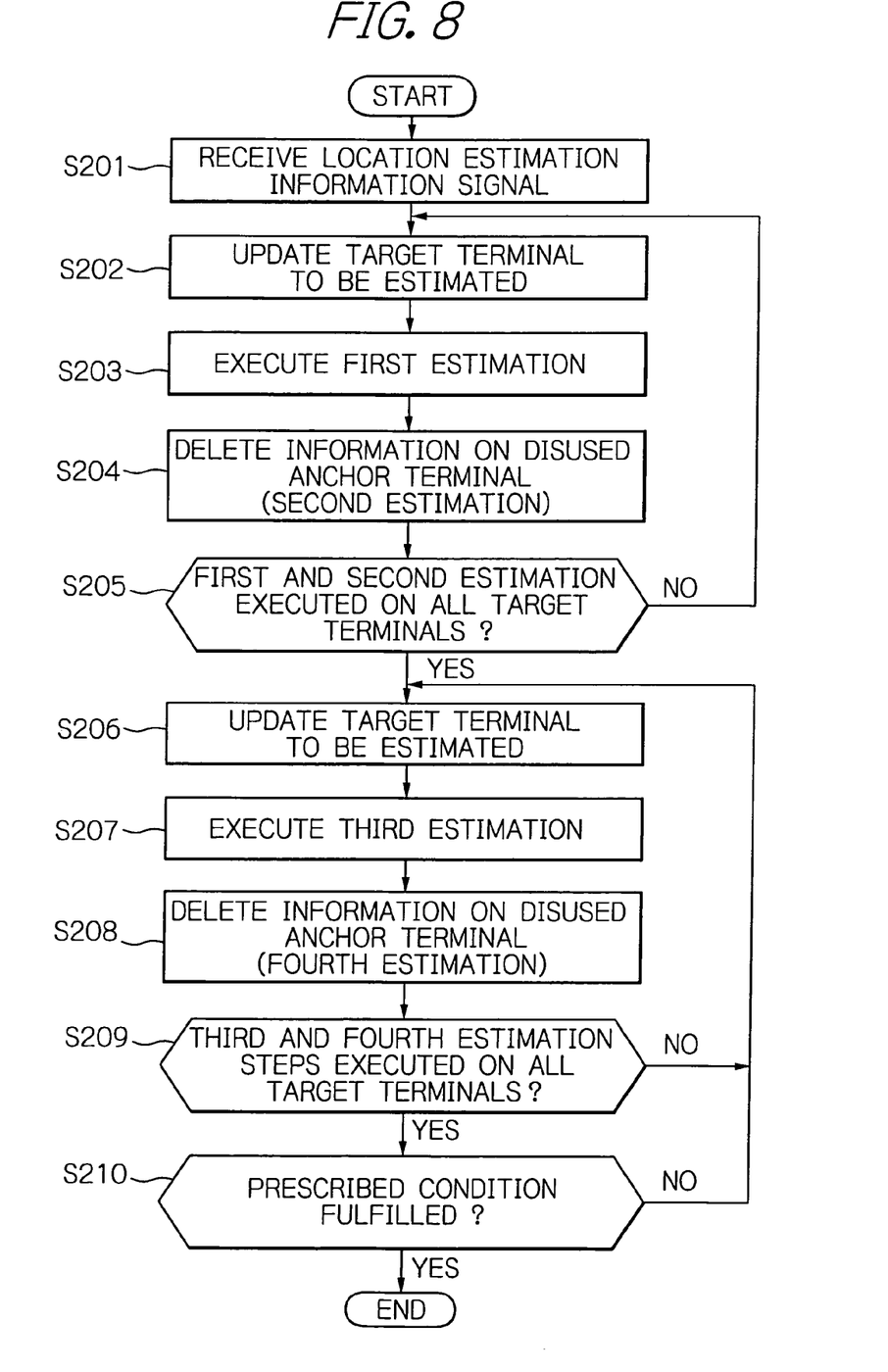
FIG. 8 is a flowchart useful for understanding the operation of a location estimation of the other alternative embodiment shown in FIG. 7.

FIG. 8 is a flowchart for use in understanding the operation of location estimation. Each target terminal 10 transmits to all neighboring terminals a location-estimation request signal 32 or 38 including a unique identification code of the target terminal 10 as a transmitting terminal code. The anchor terminals 20 or target terminals 10 which receives the location-estimation request signal 32 or 38, in turn, measures the received power value S1 of the received signal and transmits the information on the power value S1 and the transmitting terminal code along with a location estimation information signal containing its own identification code to the location estimator 30 in the form of signals 34 and 36, respectively.

The location estimator 30 receives the location estimation information signal 34 or 36, respectively, from the anchor terminals 20 or target terminals 10 and collects information contained in the information signal to store the information in respect of the identification code of the respective target terminals 10 (S201).

The location estimator 30 then selects a target terminal to be estimated (S202) and performs, in the same manner as step S102 in the first embodiment, a first estimation step S203 on the target terminal thus selected for obtaining an estimated location of the target terminal 10.

After that, corresponding to steps S103-S106 in the first embodiment, the estimator 30 deletes information on nonuse terminals, obtaining a second estimated location of the target terminal 10 in question, executing a second estimation step S204 to iterate the processing until a certain condition is fulfilled. The estimator 30 carries out the first and second estimation steps on all target terminals (S205). Consequently, the second estimated locations for all target terminals 10 are obtained.

Then, the location estimator 30 selects one target terminal 10 as an object of the location estimation (S206) and executes a third estimation step S207 for obtaining a third estimated location of the selected terminal 10. In the third estimation stage, each target terminal 10 is assumed as an anchor terminal, allocated at the second estimated locations obtained in step S204, thereby obtaining an estimated location of the selected terminal 10 in the same way as step S102 in the first embodiment. More specifically, the location estimation in step S207 is carried out by using information, inclusive of information on the anchor terminals 20 and neighboring target terminals 10.

The location estimator 30 then calculates the estimated distances Di between the target terminal 10 in question and each anchor terminal 20 based on the third estimated location while calculating the expected values Ri of the distances between the target terminal 10 in question and each anchor terminal 20 based on the information required for the location estimation, and makes a comparison between the estimated distances Di and the expected values Ri to thereby select one or more anchor terminals 20 as nonuse terminal/terminals. The selection of nonuse terminals is performed in the same way as in step S103 of the first embodiment.

After the selection of nonuse terminals, the location estimator 30 deletes the information on the selected-nonuse anchor terminals 20 in a manner similar to that described in connection with the step S104 of the first embodiment, and based on the information on the anchor terminals 20 other than those of the nonuse terminal, executes a fourth estimation step S208 for obtaining a fourth estimated location of the target terminal 10 in question. The estimated location herein is obtained in the similar way as the second estimation step S204. The third and fourth estimation steps S207 and S208 are carried out on all target terminals (S209).

The location estimator 30 then determines whether or not a prescribed condition is fulfilled (S210). If the condition is fulfilled, the estimator 30 finishes the location estimation processing, or otherwise iterates the steps S206 to S210. At this time, the estimator 30 performs the fourth estimation step S208 by using the fourth estimated location of the target terminal 10 in question obtained in step S208 as third estimated location to thereby obtain the fourth estimated location once again. The determination in step S210 on whether or not the prescribed condition is fulfilled is made by the similar determination step S106 of the first embodiment.

Upon execution of the third and fourth estimation steps S207 and 208, the estimated location of the target terminal 10 is updated from the third estimated location to the fourth estimated location. Since the estimated location of the target terminal 10 in question is used to estimate the locations of other target terminals 10, the update of the estimated location of the target terminal 10 has effect on the location estimation for the other target terminals 10.

Therefore, when the estimated location of the target terminal 10 is changed due to the update, the location estimation is executed again on another target terminal 10. More specifically, the fourth estimated location is used as the third estimated location, and the fourth estimation step S208 is iterated on all target terminals 10 except the target terminal 10 in question through the steps S206 to S210. The continuation of iteration of the fourth estimation step S208 is determined either when the results of the location estimation of all target terminals 10 have converged or depending on whether or not a predetermined number of iteration has been done.

As described, in the third embodiment one of the target terminals 10 may send out information received from another of the target terminals 10 to the location estimator 30. That enables the system to use the information transmitted between the target terminals 10 to accomplish the location estimation. Consequently, in addition to the advantages attained in the second embodiment, more accurate estimation can be implemented even where the number of anchor terminals 20 is small, so that the increase in communications traffic can be reduced. In addition, the location estimation is iterated by using the results of location estimation of neighboring target terminals 10, thereby allowing location estimation with less error.

Furthermore, when selecting the anchor terminals 20 not to be used for the location estimation and the neighboring target terminals 10, a target terminal 10 having a larger estimation error is selected on a priority basis, whereby the accuracy of the estimation can be significantly improved in comparison with a situation where anchor terminals to be used is not reduced.

In the other alternative embodiment described above, as well in the first embodiment, defects or malfunctions of the anchor terminals 20 may be determined to select the anchor terminals determined defective as nonuse terminals. In this case, the location estimator 30 stores information on a nonuse terminal each time of its selection. When the first to fourth estimated locations of another target terminal 10 are obtained and also when nonuse terminals are selected, the nonuse terminals can be selected on the basis of the stored information.

Furthermore, the location estimation processor 106 of the third embodiment can utilize, as in the case with the first embodiment, the information derived from the same anchor terminal 20 in the past to form a plurality of location-estimation request signals for the location estimation.

The entire disclosure of Japanese patent application Nos. 2007-45041 and 2007-209375 filed on Feb. 26 and Aug. 10, 2007, including the specifications, claims, accompanying drawings and abstracts of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A method of estimating a location of a target terminal by using a radio signal and a location of a plurality of anchor terminals, the radio signal being transmitted at least in either of directions from the target terminal to the plurality of anchor terminals and from the plurality of anchor terminals to the target terminal, comprising the steps of:

using information required for location estimation derived from the radio signal and the location of at least one of the plurality of anchor terminals to obtain a first estimated location of the target terminal;

calculating an estimated distance between the target terminal and the at least one anchor terminal based on the first estimated location, and calculating an expected value of a distance between the target terminal and the at least one anchor terminal based on the information required for the location estimation;

comparing the estimated distance with the expected value to thereby select at least one of the plurality of anchor terminals as a nonuse terminal; and using the information required for the location estimation derived from the radio signal transmitted at least either of the directions except for the nonuse terminal, and the location of ones of the plurality of anchor terminals other than the nonuse terminal to obtain a second estimated location of the target terminal.

2. A system for estimating a location of a target terminal, comprising:

a target terminal for transmitting a radio signal;

a plurality of anchor terminals each arranged at a known location for receiving the radio signal; and a location estimator for estimating a location of said target terminal, said location estimator using information required for location estimation derived from the radio signal and the location of said plurality of anchor terminals to obtain a first estimated location of said target terminal, calculating an estimated distance between said target terminal and at least one of said anchor terminals based on the first estimated location, calculating an expected value of a distance between said target terminal and said at least one anchor terminal based on the information required for the location estimation, comparing the estimated distance with the expected value to thereby select at least one of said plurality of anchor terminals as a nonuse terminal, using the information required for the location estimation derived from the radio signal transmitted to or from ones of said plurality of anchor terminals other than the nonuse terminal and the location of said anchor terminals other than the nonuse terminal to obtain a second estimated location of said target terminal.

3. The system in accordance with claim 2, further comprising an additional target terminal, said location estimator obtaining the second estimated location of said additional target terminal, selecting one of said target terminals, regarding at least one of said target terminals except the selected target terminal as an anchor terminal arranged at the second estimated location, and using the information required for the location estimation derived from the radio signal transmitted in connection with the selected target terminal and said plurality of anchor terminals and the location of the plurality of anchor terminals to obtain a third estimated location of the selected target terminal, calculating an estimated distance between the selected target terminal and said plurality of anchor terminals based on the third estimated location, calculating the expected value of the distance between the selected target terminal and said plurality of anchor terminals based on the information required for the location estimation, comparing the estimated distance with the expected value to thereby select at least one of said plurality of anchor terminals as a nonuse terminal, using the information required for location estimation derived from the radio signal transmitted between said selected target terminal and ones of said plurality of anchor terminals other than the nonuse terminal and the location of said anchor terminals other than the nonuse terminal to obtain a fourth estimated location of said selected target terminal.

4. The system in accordance with claim 3, wherein said location estimator obtains the fourth estimated location for each of said plurality of target terminals.

5. The system in accordance with claim 2, wherein said location estimator uses the second estimated location of said target terminal, when obtained, as the first estimated location, to calculate the estimated distance, said location estimator comparing the estimated distance with the expected value to select thereby the nonuse terminal, obtaining the second estimated location again.

6. The system in accordance with claim 5, wherein said location estimator repeatedly obtains the second estimated location until a predetermined condition is fulfilled.

7. The system in accordance with claim 3, wherein said location estimator uses, when the third estimated location of said target terminal is obtained, the fourth estimated location of said target terminal as a third estimated location to calculate the estimated distance, comparing the estimated distance with the expected value to thereby select at least one nonuse terminal, obtaining the fourth estimated location again.

8. The system in accordance with claim 7, wherein said location estimator repeatedly obtains the fourth estimated location until a predetermined condition is fulfilled.

9. The system in accordance with claim 6, wherein said location estimator determines that the predetermined condition is fulfilled when the second or fourth estimated location is obtained for a certain number of times or when the second or fourth estimated location of said target terminal is determined to have converged.

10. The system in accordance with claim 6, wherein said location estimator determines that the predetermined condition is fulfilled when an existence probability of said target terminal at the second or fourth estimated location gets lower than an existence probability of said target terminal at the first or third estimated location.

11. The system in accordance with claim 6, wherein said location estimator determines that the predetermined condition is fulfilled when a value obtained by dividing the existence probability of said target terminal at the second or fourth estimated location by the number of said anchor terminals used for the location estimation gets lower than a value obtained by dividing the existence probability of said target terminal at the first or third estimated location by the number of said anchor terminals used.

12. The system in accordance with claim 2, wherein said location estimator stores information on the nonuse terminal when selected, determining a defect of said plurality of anchor terminals on a basis of the stored information to define one of said plurality of anchor terminals which is determined defective as the nonuse terminal.

13. The system in accordance with claim 2, wherein the information required for location estimation includes a received signal strength of the radio signal.

14. The system in accordance with claim 2, wherein said location estimator stores the information required for location estimation derived from the radio signal to use the stored information to obtain the second or fourth estimated locations of said target terminal.

15. The system in accordance with claim 2, wherein said location estimator stores the information required for location estimation derived from the radio signal, selects the stored information according to a period of time elapsing from a reception of the radio signal, and uses the selected information to obtain the second or fourth estimated location of said target terminal.

16. The system in accordance with claim 2, wherein said location estimator selects, among said plurality of anchor terminals, a predetermined number of the nonuse terminals in a descending order of a difference value between the estimated distance and the expected value.

17. The system in accordance with claim 2, wherein said location estimator selects, among said plurality of anchor terminals, a predetermined number of the nonuse terminals in a descending order of a value of the estimated distance or the expected value.

18. The system in accordance with claim 3, wherein said location estimator stores information on the selected nonuse terminal each time the second or fourth estimated location is obtained,     selecting, based on the stored information, the nonuse terminal when obtaining the second or fourth estimated location again.

19. The system in accordance with claim 16, wherein the predetermined number is determined on the basis of at least either of the estimated distance and the expected value.

20. A location estimator for estimating a location of a target terminal for transmitting a radio signal toward a plurality of anchor terminals each arranged at a known location for receiving the radio signal, wherein information required for location estimation derived from the radio signal and the location of the plurality of anchor terminals are used to obtain a first estimated location of the target terminal,     an estimated distance being calculated between the target terminal and at least one of the anchor terminals based on the first estimated location,     an expected value of a distance being calculated between the target terminal and the at least one anchor terminal based on the information required for the location estimation,     the estimated distance being compared with the expected value to thereby select at least one of the plurality of anchor terminals as a nonuse terminal,     the information required for the location estimation derived from the radio signal transmitted to or from ones of the plurality of anchor terminals other than the nonuse terminal and the location of the anchor terminals other than the nonuse terminal being used to obtain a second estimated location of the target terminal.

21. The location estimator in accordance with claim 20, wherein said estimator is included in the target terminal.

\* \* \* \* \*